United States Patent
Gysling et al.

(10) Patent No.: US 12,044,563 B2
(45) Date of Patent: Jul. 23, 2024

(54) SPEED OF SOUND AND CONVECTIVE VELOCITY AUGMENTED Coriolis METERS WITH DRIVE GAIN LIMIT LOGIC

(71) Applicant: Expro Meters, Inc., Wallingford, CT (US)

(72) Inventors: Daniel L. Gysling, South Glastonbury, CT (US); Gabriel Dragnea, Denver, CO (US)

(73) Assignee: Expro Meters, Inc., Wallingford, CT (US)

( * ) Notice: Subject to any disclaimer, the term of this patent is extended or adjusted under 35 U.S.C. 154(b) by 135 days.

(21) Appl. No.: 17/482,044

(22) Filed: Sep. 22, 2021

(65) Prior Publication Data
US 2022/0090950 A1   Mar. 24, 2022

Related U.S. Application Data

(60) Provisional application No. 63/084,766, filed on Sep. 29, 2020, provisional application No. 63/081,550, filed on Sep. 22, 2020.

(51) Int. Cl.
| | |
|---|---|
| *G01F 1/86* | (2006.01) |
| *G01F 1/84* | (2006.01) |
| *G01N 11/04* | (2006.01) |

(52) U.S. Cl.
CPC .............. *G01F 1/86* (2013.01); *G01F 1/8436* (2013.01); *G01N 11/04* (2013.01)

(58) Field of Classification Search
CPC .......... G01F 1/86; G01F 1/8436; G01N 11/04
USPC ..................................................... 73/861.02
See application file for complete search history.

(56) References Cited

U.S. PATENT DOCUMENTS

| | | |
|---|---|---|
| 4,262,523 A | 4/1981 | Stansfeld |
| 7,134,320 B2 | 11/2006 | Gysling |
| 7,152,460 B2 | 12/2006 | Gysling |
| 7,299,705 B2 | 11/2007 | Gysling |
| 7,343,820 B2 | 3/2008 | Gysling |
| 7,380,438 B2 | 6/2008 | Gysling |

(Continued)

OTHER PUBLICATIONS

Basse, N. T., A review of the theory of Coriolis flowmeter measurement errors due to entrained particles, Flow Measurement and Instrumentation 37 (2014) 107-11.

(Continued)

*Primary Examiner* — Alexander A Mercado
*Assistant Examiner* — Rodney T Frank
(74) *Attorney, Agent, or Firm* — Getz Balich LLC

(57) ABSTRACT

A system and method for sensing a process fluid is provided. The method includes: a) using a Coriolis meter (CM) having a flow tube to determine a CM mass flow value, a CM density value, and a drive gain signal; b) using a sensor array having a plurality of sensors configured to sense a characteristic of the process fluid that convects with the process fluid through the flow tube, and produce sensor signals representative of the process fluid characteristic convecting with the process fluid, and a sensor array processing unit in communication with the sensor array to determine a convective velocity of the process fluid; and c) reporting a first mass flow rate of the process fluid as measured by the CM or a second mass flow rate using the convective velocity and the CM density value based on the drive gain signal relative to a predetermined drive gain threshold.

6 Claims, 12 Drawing Sheets

(56) References Cited

U.S. PATENT DOCUMENTS

| | | | |
|---|---|---|---|
| 7,380,439 B2 | 6/2008 | Gysling | |
| 7,389,687 B2 | 6/2008 | Gysling | |
| 7,793,555 B2 | 9/2010 | Gysling | |
| 2005/0039520 A1 | 2/2005 | Davis | |
| 2005/0044929 A1 | 3/2005 | Gysling | |
| 2005/0061060 A1* | 3/2005 | Gysling | G01F 1/849 |
| | | | 73/32 R |
| 2009/0013799 A1 | 1/2009 | Gysling | |
| 2021/0010841 A1 | 1/2021 | Gandarillas | |
| 2021/0018416 A1* | 1/2021 | Hollingsworth | G01F 1/8436 |
| 2021/0172782 A1* | 6/2021 | Gysling | G01F 1/8431 |

OTHER PUBLICATIONS

Gysling, D., "An Aeroelastic model of Coriolis mass and density meters operating on aerated mixtures" Journal of Flow Measurement and Instrumentation, vol. 18, Issue 2 Apr. 2007, pp. 69-77.

Hemp, J., and Kutin, J. "Theory of errors in Coriolis flowmeter readings due to compressibility of the fluid being metered", Journal of Flow Measurement and Instrumentation, vol. 17, Issue 6, Dec. 2006, pp. 359-369.

Weinstein, J., "Multiphase Flow in Coriolis Mass Flow Meters—Error Sources and Best Practices", 28th International North Sea Flow Measurement Workshop Oct. 26-29, 2010.

International search report for PCT/US2021/051540 dated Dec. 7, 2021.

\* cited by examiner

SPEED OF SOUND AND CONVECTIVE VELOCITY AUGMENTED Coriolis METERS WITH DRIVE GAIN LIMIT LOGIC This application claims priority to U.S. Patent Application No. 63/081,550 filed Sep. 22, 2020, and U.S. Patent Application No. 63/084,766 filed Sep. 29, 2020, each of which applications is hereby incorporated by reference herein in its entirety.

BACKGROUND OF THE INVENTION

1. Technical Field

The present disclosure is related to fluid flow sensing devices that utilize vibrating tubes in general, and to methods for improving fluid flow sensing in a fluid flow sensing device that utilizes vibrating tubes.

2. Background Information

Coriolis meters are a flow meter of choice from many industrial applications. In general, Coriolis meters provide accurate, robust measurement of mass flow, density, and volumetric flow of process fluids that are homogeneous and that can be considered to be essentially incompressible. However, Coriolis meters are often challenged by non-homogeneous fluids and fluids with varying compressibility. For example, Coriolis meters are well known to often encounter operability and accuracy issues measuring bubbly fluids, i.e., liquids with entrained gases.

Most Coriolis meters provide two fundamental measurements of a process fluid (i.e., the fluid passing through the Coriolis meter): mass flow rate and density. Each of these measurements is based on measuring the vibrational characteristics of one or more vibratory modes of one or more vibrating, fluid-conveying flow tubes.

Conventional Coriolis meters typically determine process fluid mass flow rate by measuring a phase shift in the mode shape of one or more vibratory modes of the one or more fluid conveying tubes of the meter. The vibration of the flow tubes sets up an oscillatory, rotational vibration of the flow tubes. The motion of the fluid through the oscillating flow tubes may set up a Coriolis effect which distorts the mode shape of the vibration mode in proportion to the mass flow of the fluid. Conventional Coriolis meters measure this distortion, through a calibration process based on homogeneous fluid operating at a sufficiently low reduced frequency and interprets this phase shift in terms of mass flow of the process fluid.

Conventional Coriolis meters typically determine process fluid density by measuring the natural frequency of one or more fluid filled flow tubes. The vibratory frequency of the process fluid filled flow tube is determined by the stiffness of the flow tube and the combined mass of the flow tube and the fluid-conveyed within the flow tube. As the density of the process fluid increases, the natural frequency of the fluid filled flow tube decreases. Conventional Coriolis meters interpret the natural frequency of the fluid conveying tubes in terms of fluid density based on calibration on homogeneous fluids operating at a sufficiently low reduced frequency.

Accurate calibration of each of these effects relies on accurate characterization of the coupling of the fluid to the vibration of the structure. Most prior art relies on a model which is calibrated based on a homogeneous fluid, vibrating at a low reduced frequency. The introduction of fluid inhomogeneities and variability in fluid compressibility (which results in variability in the reduced frequency) alter how the fluid and structure are coupled, and thus alter the relationship between a measured phase shift (mode distortion) and an interpreted mass flow, and a measured natural frequency and an interpreted process fluid density.

U.S. Pat. Nos. 7,134,320; 7,152,460; 7,299,705; 7,343,820; 7,380,438; 7,380,439; 7,389,687; 7,596,987; and 7,793,555, each of which shares an inventor with the present application and each of which is hereby incorporated by reference in its entirety, disclose the use of SONAR flow measurement technology to measure volumetric flow and process fluid sound speed.

SUMMARY

According to an aspect of the present disclosure, a system for sensing a process fluid is provided that includes a vibrating tube flow meter, a sensor array, a sensor array processing unit (SAPU), and a system processing unit (SPU). The vibrating tube flow meter has at least one flow tube, and is configured to selectively provide a measurement of a mass flow of the process fluid, a measurement of the density of the process fluid, and a drive gain signal, the process fluid passing through the at least one flow tube. The sensor array has a plurality of sensors configured to sense a characteristic of the process fluid that convects with the process fluid through at least one flow tube, and to produce sensor signals representative of the process fluid characteristic convecting with the process fluid. The SAPU is in communication with the sensor array and a memory device storing executable SAPU instructions, wherein the SAPU instructions when executed cause the sensor array processing unit to process the sensor signals to determine a convective velocity of the process fluid. The SPU is in communication with the vibrating tube flow meter, the SAPU, and a memory device storing executable SPU instructions, wherein the SPU instructions when executed cause the SPU to: a) control the vibrating tube flow meter to produce the drive gain signal; and b) report a first mass flow rate of the process fluid as measured by the vibrating tube flow meter when the drive gain signal is at or below a predetermined drive gain threshold, or report a second mass flow rate of the process fluid as determined using the convective velocity and a density of the process fluid as measured by the vibrating tube flow meter when the drive gain signal is above the predetermined drive gain threshold.

In any of the aspects or embodiments described above and herein, the SAPU instructions when executed may cause the SAPU to determine a quality metric, and the predetermined drive gain threshold may be a function of the quality metric.

In any of the aspects or embodiments described above and herein, the plurality of sensors in the sensor array may be strain based sensors.

In any of the aspects or embodiments described above and herein, the plurality of sensors may be mounted on the at least one flow tube.

In any of the aspects or embodiments described above and herein, the SAPU instructions when executed may cause the SAPU to process the sensor signals to determine a convective quality value.

In any of the aspects or embodiments described above and herein, the SPU instructions when executed may cause the SPU to adjust a drive gain limit of the vibrating tube flow meter if the convective quality value is at or above a convective quality value threshold.

According to an aspect of the present disclosure, a system for sensing a process fluid is provided that includes a Coriolis meter (CM), a sensor array (SA), a sensor array processing unit (SAPU), and a system processing unit (SPU). The CM has at least one flow tube and is configured to selectively provide a measurement of a mass flow of the process fluid, a measurement of the density of the process fluid, and a drive gain signal. The process fluid passes through the at least one flow tube. The sensor array has a plurality of sensors configured to sense a characteristic of the process fluid that convects with the process fluid through at least one flow tube, and produce sensor signals representative of the process fluid characteristic convecting with the process fluid. The SAPU is in communication with the SA and a memory device storing executable SAPU instructions, wherein the SAPU instructions when executed cause the SAPU to process the sensor signals to determine a convective velocity of the process fluid and a speed of sound (SOS) of the process fluid. The SPU is in communication with the CM, the SAPU, and a memory device storing executable SPU instructions. The SPU instructions when executed cause the SPU to: a) produce a CM mass flow rate using the CM; b) produce a CM density value using the CM; c) produce a GVF using the SOS and the CM density value; d) produce a SA mass flow rate using the convective velocity and the CM density value; and e) report the CM mass flow rate when the drive gain signal is at or below a predetermined drive gain threshold, or report the SA mass flow rate when the drive gain signal is above the predetermined drive gain threshold.

In any of the aspects or embodiments described above and herein, the CM mass flow rate may be a corrected CM mass flow rate determined using the GVF.

In any of the aspects or embodiments described above and herein, the CM density value may be a corrected CM density value.

According to another aspect of the present disclosure, a method for sensing a process fluid is provided. The method includes: a) using a Coriolis meter (CM) having at least one flow tube to determine a CM mass flow value of the process fluid, a CM density value of the process fluid, and a drive gain signal, the process fluid passing through the at least one flow tube; b) using a sensor array having a plurality of sensors configured to sense a characteristic of the process fluid that convects with the process fluid through at least one flow tube, and produce sensor signals representative of the process fluid characteristic convecting with the process fluid, and a sensor array processing unit (SAPU) in communication with the sensor array to determine a convective velocity of the process fluid using the sensor signals; and c) reporting a first mass flow rate of the process fluid as measured by the CM when the drive gain signal is at or below a predetermined drive gain threshold, or reporting a second mass flow rate of the process fluid as determined using the convective velocity and the CM density value when the drive gain signal is above the predetermined drive gain threshold.

According to another aspect of the present disclosure, a method of sensing a process fluid is provided. The method includes: a) using a Coriolis meter (CM) having at least one flow tube to determine a CM mass flow value of the process fluid, a CM density value of the process fluid, and a drive gain signal, the process fluid passing through the at least one flow tube; b) using a sensor array having a plurality of sensors configured to sense a characteristic of the process fluid that convects with the process fluid through at least one flow tube, and produce sensor signals representative of the process fluid characteristic convecting with the process fluid, and a sensor array processing unit (SAPU) in communication with the sensor array to determine a convective velocity of the process fluid using the sensor signals and a speed of sound of the process fluid using the sensor signal; and c) reporting a first mass flow rate of the process fluid as measured by the CM when the drive gain signal is at or below a predetermined drive gain threshold, or reporting a second mass flow rate of the process fluid as determined using the convective velocity, the SOS, and the CM density value when the drive gain signal is above the predetermined drive gain threshold.

In any of the aspects or embodiments described above and herein, the method further comprising determining a gas void fraction value of the process fluid using the determined speed of sound and the CM density value.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
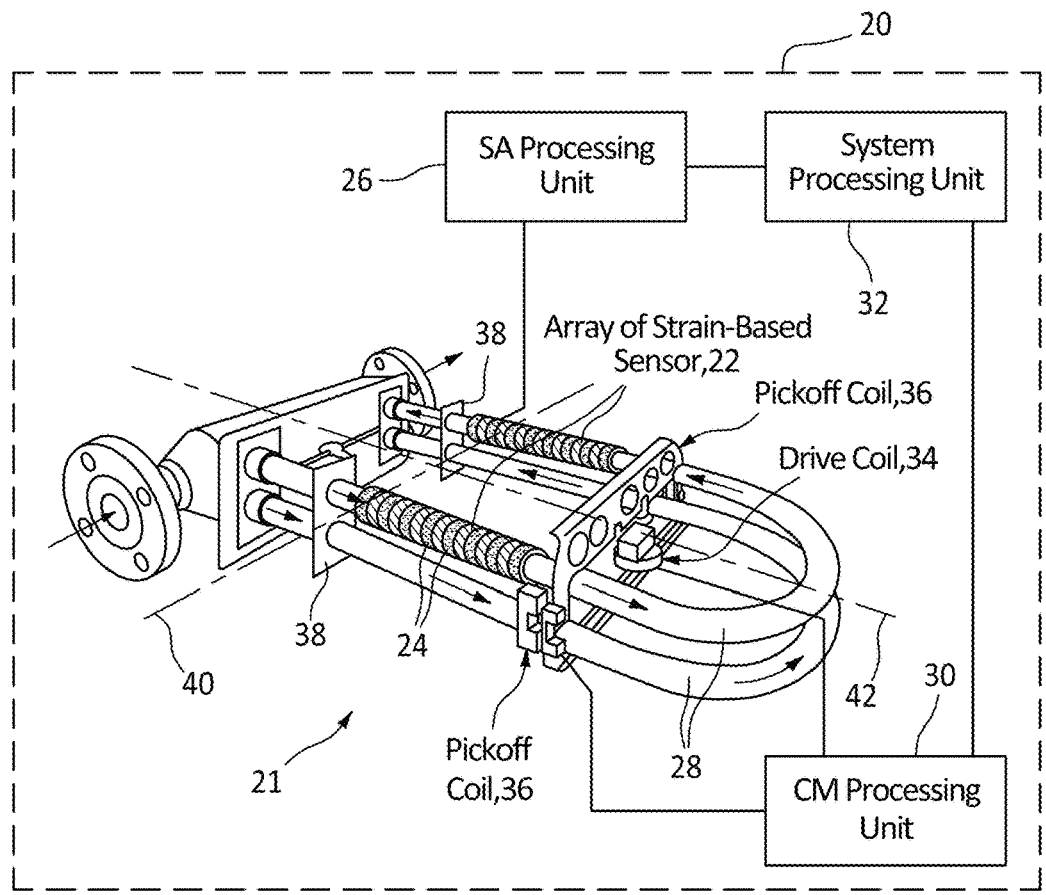
FIG. 1 is a diagrammatic view of a present disclosure system embodiment.
Figure 2:
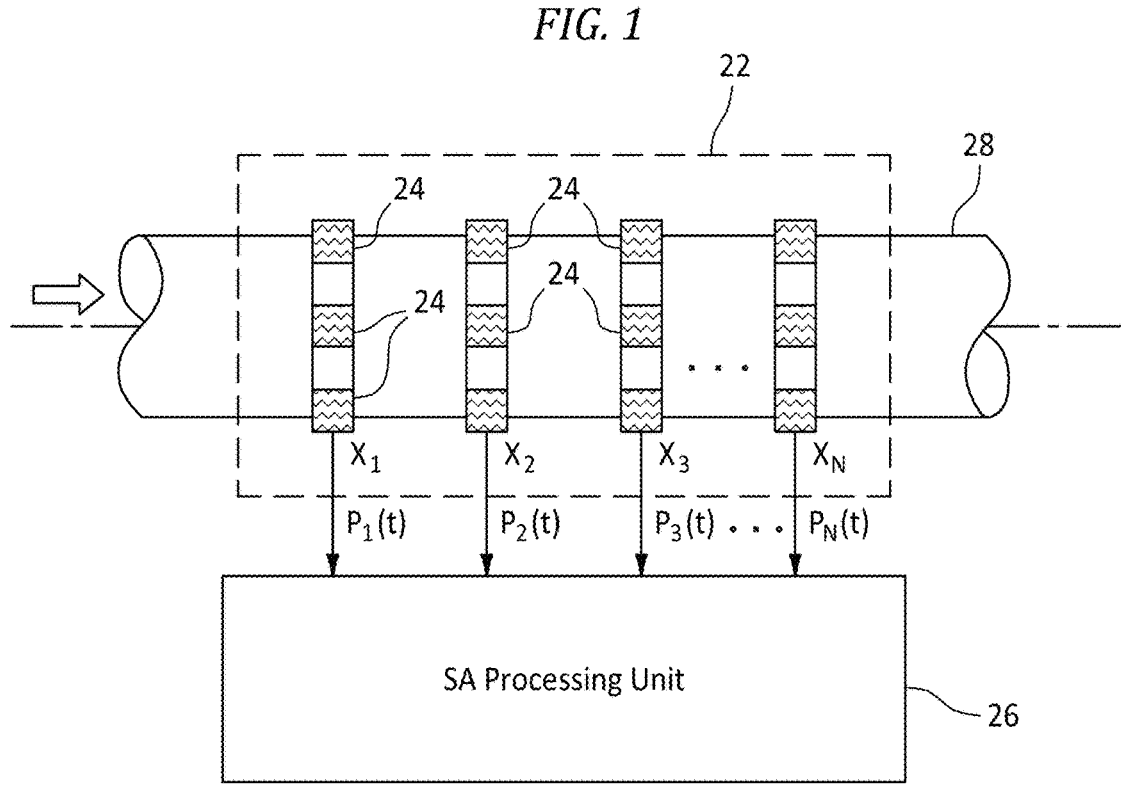
FIG. 2 is a diagrammatic view of a sensor array mounted on a conduit.
Figure 3:
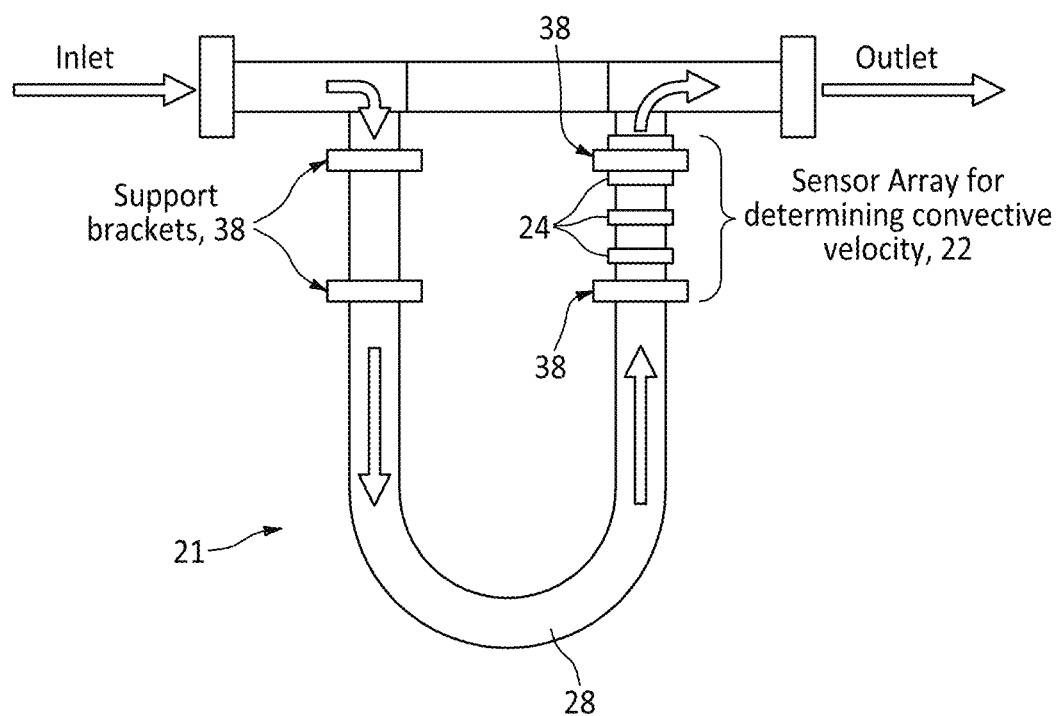
FIG. 3 is diagrammatic view of a sensor array embodiment mounted on a flow tube of a Coriolis meter.

Referring to FIGS. 1-3, the present disclosure is directed to a system 20 and method for measuring one or more fluid parameters (e.g., mass flow, fluid density, volumetric flow rate, etc.) of a process fluid flow disposed within a flow meter having one or more vibratable tubes such as a Coriolis meter 21. According to aspects of the present disclosure, the system 20 may include an array 22 of strain sensors 24 and a sensor array processing unit 26 ("SA processing unit"). The strain sensors 24 are configurable to be applied to an exterior surface of a conduit (hereinafter referred to as a "flow tube 28") that contains a fluid for passage along an axis of the flow tube 28. The flow tube 28 may comprise a metallic material. The flow tube 28 is typically cylindrical, but the present disclosure is not limited to a cylindrical cross-section flow tube 28. The strain sensors 24 are configured to sense unsteady pressures (e.g., associated with acoustic signals) within the fluid flow by sensing strain within the wall of the flow tube 28. The present disclosure is not limited to any particular type of strain sensor. Non-limiting examples of acceptable strain sensors 24 include piezoelectric sensors such as, but not limited to macro fiber composite (MFC) type sensors, piezoelectric film (PVDF) type sensors, etc. The sensor array 22 includes at least two sensors 24 axially spaced apart from one another. In many applications, an array of eight sensors 24 axially spaced apart from one another is useful but the array 22 may include more or fewer sensors 24. The sensor array 22 may have a single sensor at a given axial position ($X_1, X_2, X_3, \ldots X_N$) or it may include a plurality of sensors 24 disposed at a given axial position; e.g., two sensors disposed at axial position $X_1$, two sensors disposed at axial position $X_2$, two sensors disposed at axial position $X_3$, and so on. The sensor array configurations disclosed in U.S. Patent Publication No. 2021/0010841, which is hereby incorporated by reference in its entirety, are examples of sensor arrays that may be used with the present disclosure.

The strain sensor array 22 is in communication with the SA processing unit 26. Signals ($P_1(t)$-$P_N(T)$) representative of the sensed strain are provided by the sensors 24 to the SA processing unit 26. The SA processing unit 26 may, in turn, process the sensor signals and may determine a fluid flow parameter (e.g., SOS, convective velocity, etc.) of the fluid passing within the flow tube 28. Using a sensor array to determine a fluid flow parameter of a fluid flow passing within a flow tube is known, and the present disclosure is not limited to any particular device and/or methodology configured for the same. Acceptable devices and/or methodologies that may be used to determine the fluid flow parameter include, but are not limited to, those disclosed in U.S. Patent Publication No. 2021/0010841. These devices/systems or the like may be modified according to aspects of the present disclosure to provide distinct advantage when used with a flow meter having one or more vibratable tubes such as a Coriolis meter 21.

The SA processing unit 26 is in communication the sensor array 22 to control and/or receive signals therefrom to perform the functions described herein in a variety of different configurations. For example, the SA processing unit 26 may be independent of the Coriolis meter 21, or the SA processing unit 26 may be integral with a processing unit portion of a Coriolis meter 21 (i.e., a "CM processing unit 30"), or the SA processing unit 26 and sensor array 22 may be part of a system that includes Coriolis meter 21, and the Coriolis meter 21 and the SA processing unit 26 may be in communication with a system processing unit 32, or the like. Any of these processing units may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system 20 components. A processing unit may include a single memory device or a plurality of memory devices. The present disclosure is not limited to any particular type of non-transitory memory device, and may include read-only memory, random access memory, volatile memory, non-volatile memory, static memory, dynamic memory, flash memory, cache memory, and/or any device that stores digital information. A processing unit may include, or may be in communication with, an input device that enables a user to enter data and/or instructions, and may include, or be in communication with, an output device configured, for example to display information (e.g., a visual display or a printer), or to transfer data, etc. Communications between a processing unit and other system 20 components may be via a hardwire connection or via a wireless connection.

Aspects of the present disclosure may be used with a stand-alone Coriolis meter 21 or with a system that includes a Coriolis meter 21. Coriolis meters are available in a variety of different configurations; e.g., single or double bent tube Coriolis meters, straight tube Coriolis meters, etc. The present disclosure is not limited to any particular Coriolis meter configuration. To facilitate the description herein, a non-limiting example of a dual bent tube Coriolis meter is shown in FIG. 1 and described hereinafter. The Coriolis meter 21 includes a pair of bent flow tubes 28, an actuator (typically referred to as a "drive coil 34") and first and second motion sensors (typically referred to as a "pickoff coils 36"). The exemplary double flow tube Coriolis meter 21 shown in FIG. 1 further includes a pair of support flanges 38 that support the tubes 28 adjacent the pipe coupling portion of the Coriolis meter 21. The Coriolis meter 21 shown in FIG. 1 includes a sensor array 22, such as that described above, attached to a flow tube 28 of the Coriolis meter 21. The Coriolis meter 21 may be described as having an oscillating axis 40 located at the support flanges 38; i.e., the tubes 28 are cantilevered out from the support flanges 38 and may oscillate about the oscillating axis 40. The Coriolis meter 21 may also be described as having a twist axis 42 centrally located with respect to the flow tube 28 and generally perpendicular to the oscillating axis 40; i.e., the cantilevered tubes 28 may oscillate about the twist axis 42. During operation, the drive coil 34 is operated to drive a vibratory structural mode of the flow tubes 28 at resonance, and the pickoff coils 36 are configured to sense the motion of the respective tubes 28 and provide a signal representative of that motion. The Coriolis meter 21 measures the natural frequency of the flow tubes 28 to determine process fluid density and measures a phase lag associated with the twist of the tubes 28 to determine mass flow. The dominant structural vibration within the Coriolis flow tubes 28 is the intentionally driven vibration at a resonant frequency of flow tubes 28. The resonant frequency of the flow tubes 28 changes with operating conditions such as, but not limited to, any one of changes in process fluid density, temperature of the flow tubes 28, fluid pressure within the flow tubes 28, or any combination thereof. The pickoff coils 36 sense the motion of the tubes 28 and provide signal feedback that may be used to maintain the tubes 28 at the resonant frequency. As stated above, the present disclosure is not limited to the exemplary double bent tube Coriolis meter 21 described above and shown within FIG. 1.

Process fluid sound speed and/or convective velocity measurements can augment Coriolis flow meters to mitigate errors due to decoupling and compressibility effects. One model to account for the effects of decoupling (due to inhomogeneities) and compressibility on the measured density of bubbly liquid is given by Hemp:

$$\rho_{measured} = \rho_{liq}\left(1 - K_{D_1}\alpha + \frac{1}{4}f_{red}^2\right) \quad \text{(Eqn. 1)}$$

$$f_{red} \equiv \frac{2\pi f_{tube}R_{tube}}{a_{mix}}$$

where $\rho_{liq}$ is the actual density of the liquid phase of the process fluid, Kai is a decoupling parameter, $\alpha$ is the gas void fraction, $f_{red}$ is the reduced frequency defined as a function of tube vibrational frequency, $R_{tube}$ is the radius of the flow tube 28, and $a_{mix}$ is the sound speed of the process fluid. For process fluid flows with entrained gas ("bubbly flows"), the decoupling parameter, $K_{D1}$, has theoretical limits, for example from 1 in the limit of high viscosity to 3 in the limit of low viscosity.

Process fluid speed of sound is a thermal-physical property of a mixture of fluids. For well-mixed fluids, the speed of sound of the process fluid is related to the speed of sound and densities of the process fluid components by Wood's Equation:

$$\frac{1}{\rho_{mix}a_{mix}^2} = \sum_{i=1}^{N} \frac{\varphi_i}{\rho_i a_i^2} + \frac{D-t}{Et} \quad \text{(Eqn. 2)}$$

where the process fluid density ($\rho_{mix}$) is given by:

$$\rho_{mix} = \sum_{i=1}^{N} \varphi_i \rho_i \quad \text{(Eqn. 3)}$$

Wood's equation is physics-based and has been validated for a broad class of mixture of liquids, and bubbly liquids. Wood's equation and a measured process fluid sound speed, along with knowledge of the density and sound speeds of the process fluid components, a measured parameter indicative of the process fluid density, and a model that relates the actual process fluid density to the measured-parameter indicative of the density (e.g., see Equation 1) enables a determination of the process fluid density, the liquid density and the gas void fraction.

Figure 4:
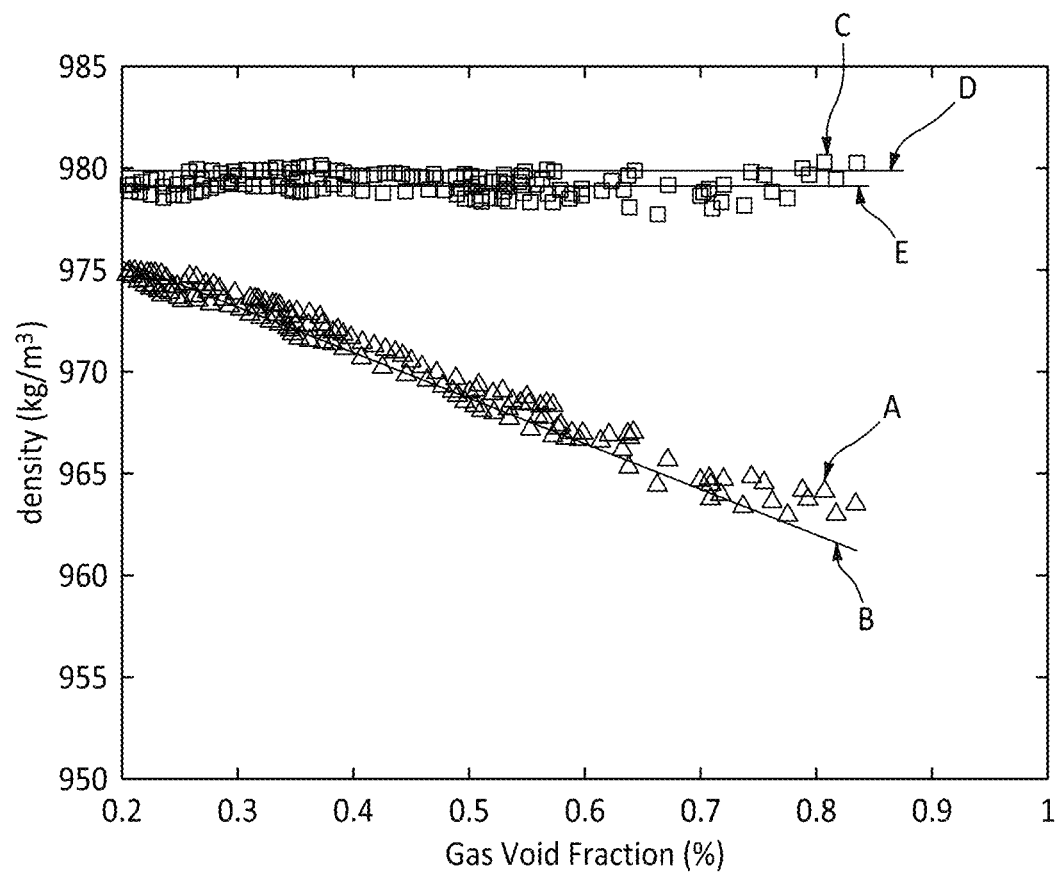
FIG. 4 is a graph of density versus gas void fraction, showing modeled data.

The graph shown in FIG. 4 illustrates an example of interpreting density measurements for a bubbly liquid with varying gas void fraction reported by a Coriolis meter calibrated for homogeneous fluids operating at a low reduced frequency in terms of the density of the liquid phase of the bubbly mixture utilizing a speed of sound augmented Coriolis meter 21. The graph of FIG. 4 shows one method in which a measured process fluid speed of sound and a measured process fluid density, can be used to mitigate the effect of decoupling and compressibility on the density measurement provided by conventional Coriolis meters. FIG. 4 plots the density data reported by a Coriolis meter 21 on a bubbly mixture of a constant 93% watercut mixture with a varying gas void fraction (GVF) of 0.2% to 0.85%. The density reported by the Coriolis meter 21 is plotted versus GVF and is shown by triangle symbols ("A"). As shown, the reported density is dependent on the GVF. The data shown in FIG. 4 reflects a model (e.g., Equation 1) and a least-square fit for the: 1) liquid density phase ("A"); 2) decoupling parameter ("B"); 3) liquid density interpreted by the model ("C"); 4) reference liquid density ("D"); and 5) best-fit average liquid density ("E"). As shown in this example, the speed of sound augmented Coriolis meter system 20 is capable of accurately interpreting the density of the liquid phase of a bubbly mixture, independent of the variable GVF.

Models similar to the model described in Equation 1 to correct for the effect of inhomogeneity and/or compressibility on a Coriolis density measurement also have been developed to correct the mass flow measured by a Coriolis meter 21 for the effect of inhomogeneity and/or compressibility. An example from Hemp is given below:

$$\dot{m}_{measured} = \dot{m}_{liquid}\left(1 - \frac{(K_{M_1} - 1)}{1-\alpha}\alpha + \frac{1}{2}f_{red}^2\right) \quad \text{(Eqn. 4)}$$

where $\dot{m}_{liquid}$ is the mass flow of the liquid, $K_{M1}$ is a decoupling parameter, similar to the decoupling parameter in the model for the density correction, $f_{red}$ is the same reduced frequency, and $\alpha$ is the GVF. Although the formulation for the influence of decoupling and compressibility for mass flow and density are similar, test data has shown that for some conditions, the mass flow measurement errors associated with multiphase process fluid are less amenable to improved interpretation provided by augmenting the Coriolis-based mass flow measurement with process fluid sound speed measurements.

For many applications, it is important that both the mass flow and the density measurement maintain operability and accuracy in the presence of fluid inhomogeneities and/or varying fluid compressibility. For example, in a density-based net oil measurement common in production surveillance of an oil and gas well, the density measurement is often used to determine a density-based watercut measurement, and the mass flow measure is often used to determine the total mass flow produced. The accuracy of these measurements is key in the determination of the total amount of oil produced.

Although, as described above, the process fluid mass flow and density measurements both rely on models of the coupling of the fluid and the structure, they are fundamentally different measurements. As fundamentally different measurements, the mass flow and the density measurement of a Coriolis meter 21 will likely have different inaccuracies and operability limitations associated with measuring fluid with varying degrees of inhomogeneities and compressibility, such as, for example, while operating on multiphase flows.

Aspects of the present disclosure include a method that is well-suited to improve the accuracies and operability of Coriolis meters in applications where the effects of inhomogeneities and/or compressibility impede the ability of the Coriolis meter 21 to measure the mass flow of a process fluid based on characterizing the effect of the fluid on the vibrational characteristics of one or more modes of a vibrating fluid flow.

Aspects of the present disclosure use an array of time-resolved measurements that measure disturbances that convect with the flow. Embodiments of the present disclosure utilize a sensor array 22 (e.g., strain-based pressure sensors), installed on one or more flow tubes 28 of a Coriolis meter 21 to measure the volumetric flow rate. Prior art teaches the use of an array of strain-based pressure sensors to measure the speed at which naturally occurring, coherent structures convect within a fluid-conveying conduit. Typically, the measured convection velocity for well-mixed flows is highly correlated to the volumetrically-averaged flow velocity. If it is assumed that the measured convective velocity equals the volumetrically averaged flow velocity, then the volumetric flow is given by the product of the cross section area and the measured convective velocity. Other models can be used to relate the measured convective velocity to the volumetric averaged flow as well. Although this method of measuring volumetric flow is typically less accurate than conventional Coriolis meters operating on homogeneous flows at low reduced frequencies, this method of determining volumetric flow is often sufficiently accurate and sufficiently robust to multiphase flow conditions.

The sensors 24 within the sensor array 22 may be spaced apart from one another on the order of 0.1 to 1 flow diameters apart and they may be located on the downstream section of a Coriolis flow tube 28. Locating the sensor array 22 on the downstream section of the Coriolis meter 21 helps to ensure that the velocity-profile within the "sensed" region of the array 22 is fully-developed, thereby, increasing the accuracy with which the measured convective velocity can be interpreted in terms of volumetric flow within the conduit. For a typical three (3) inch dual flow tube Coriolis meter, the inner diameter of each flow tube 28 is 1.8 inches. Thus, the strain-based pressure sensors 24 would be axially spaced apart from one another at distances in the range of about 0.18 inches to 1.8 inches.

Figure 5:
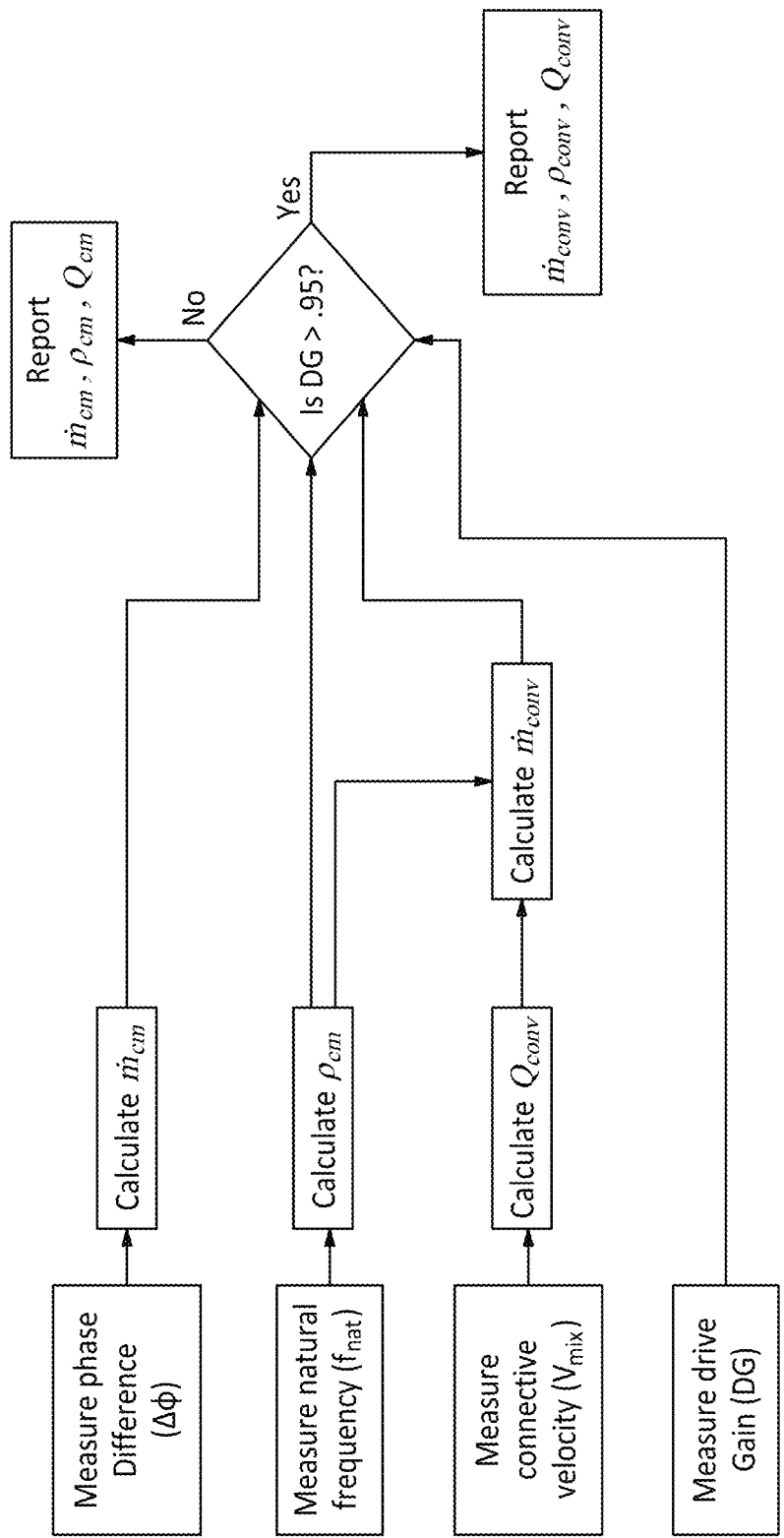
FIG. 5 is a schematic representation of a present disclosure system.

Adding the sensor array 22 to a standard Coriolis meter 21 provides an added level of robustness in determining the mass and/or volumetric flow through a Coriolis meter 21. FIG. 5 shows a flow chart describing an embodiment of a convective velocity augmented Coriolis meter system 20. In this embodiment, the convective velocity augmented Coriolis meter system 20 measures the phase difference in the tubes 28, the natural frequency of the tubes 28, the convective velocity ($V_{mix}$), and the drive gain (DG) on the Coriolis meter 21. The drive gain is a diagnostic quantity provided by most Coriolis meters that provides an indication of the strength of the signal that the Coriolis meter provides to drive the Coriolis meter at a predetermined amplitude at its resonant frequency. Ideally, the Coriolis meter 21 would maintain a predetermined amplitude of tube vibration. The strength of the drive signal required to maintain the desired amplitude is indicated by the drive gain signal. Since fluid inhomogeneities increase energy dissipation within a vibrating fluid conveying tube, the drive gain required to maintain a predetermined amplitude increases as the level of inhomogeneity increases within the process fluid. Eventually the drive gain reaches a saturation limit, and the Coriolis meter 21 is unable to maintain the desired amplitude of the tubes. At this point, the drive gain typically remains constant at its maximum value, and the amplitude of the tube vibration decreases with increasing inhomogeneity. Eventually the vibration in the flow tubes 28 ceases to be highly resonate, and the Coriolis meter 21 is said to "stall". However, before the Coriolis meter 21 stalls, it is likely to report highly inaccurate mass flow measurements. The density measurement is typically more robust, maintaining relevance to higher levels of inhomogeneity. As shown in FIG. 5, the convective velocity augmented Coriolis meter system 20 initially measures and interprets the process fluid mass flow ($\dot{m}_{cm}$) and density ($\rho_{cm}$) in a manner typical of conventional Coriolis meters. In some embodiments the process fluid mass flow ($\dot{m}_{cm}$) may initially be produced as an apparent mass flow ($\dot{m}_{app}$) and may be subsequently modified to a "corrected" mass flow ($\dot{m}_{cor}$) and the process fluid density ($\rho_{cm}$) may initially be produced as an apparent density ($\rho_{app}$) and subsequently modified to a "corrected" process fluid density ($\rho_{cor}$) as described herein. However, the convective velocity augmented Coriolis meter system 20 also measures convective flow velocity ($V_{mix}$) and interprets this flow velocity in terms of volumetric flow ($Q_{conv}$) of the process fluid. The flow chart shows a decision point in the algorithm based on drive gain (DG). Drive gain is used here as an indicator of the fidelity of the mass flow derived from the phase difference measured on the vibrating tubes 28. In this embodiment, if the drive gain exceeds a threshold value (e.g., shown as 95%), the system 20 disregards the mass flow measured from the phase difference (i.e., $\dot{m}_{cor}$—from the Coriolis meter 21), derives a mass flow ($\dot{m}_{conv}$) based on the process fluid density ($\rho_{cm}$) reported by the frequency based density measurement and the volumetric flow rate ($Q_{conv}$) determined using the sensor array 22.

In some instances, the intentional vibration of the tubes of a Coriolis meter 21 may pose a signal-to-noise (SNR) problem that can impair the ability to determine volumetric flow based on strain associated with pressure perturbations within the fluid-conveying flow tubes 28. The present disclosure teaches methods to minimize issues associated with the intentional driving of the Coriolis flow tubes 28 impairing the determination of flow rate from the sensor array 22. For example, as shown in FIG. 3, the sensors 24 of the array 22 may be located near or within the region of the flow tubes 28 constrained by support flanges 38 with the goal of minimizing strain associated with tube vibration at the location of the strain-based sensors 24 used to determine the convective flow velocity. In addition to placing the sensor advantageously on the flow tube 28, the CM processing unit 30 can be utilized to mitigate interference between intentional tube vibration and the determining the convective flow velocity. Coriolis meters typically vibrate at frequencies well above the frequencies utilized for convective velocity measurements. The frequencies utilized for convective velocity measurements scale with the convective velocity and the length scale of the convective disturbances:

$$f \sim \frac{V_{conv}}{\lambda} \sim \frac{V_{conv}}{D} \qquad \text{(Eqn. 5)}$$

Hence, for a process fluid flow rate of 2 ft/sec in a 2 inch diameter pipe, the nominal frequency would be ~12 Hz, well away from a representative the drive frequency of ~100 Hz.

Figure 6A:
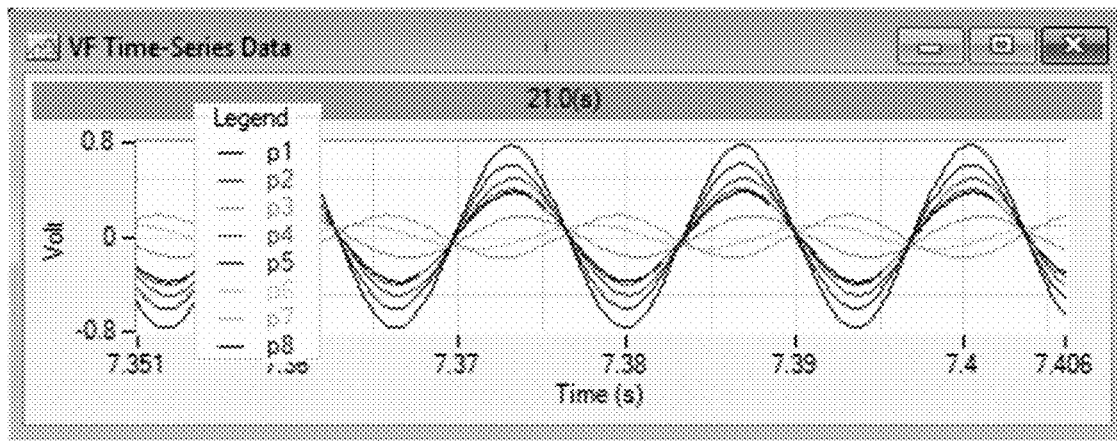
FIG. 6A is a graph of sensor signal magnitude versus time for an array of sensors sensing single phase water with a Coriolis unit operating.
Figure 6B:
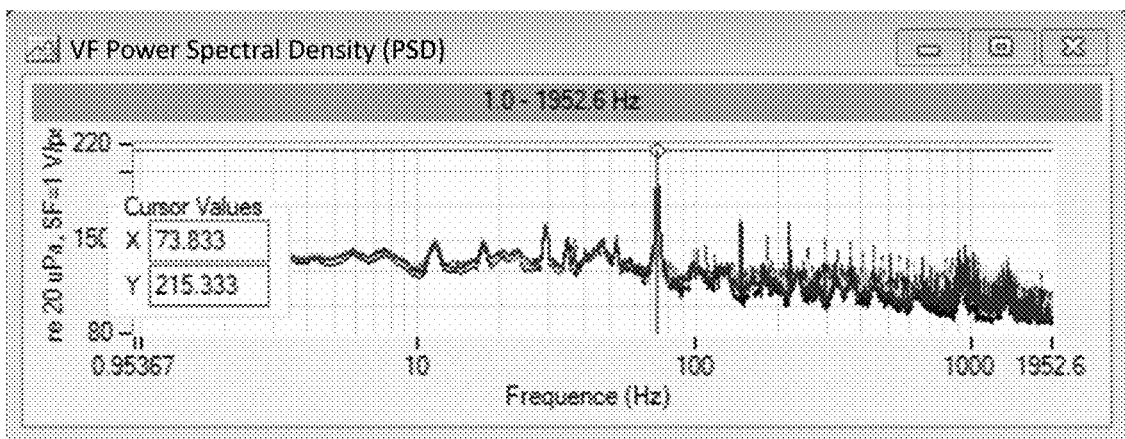
FIG. 6B is a graph of power spectral density of the sensor signals.
Figure 6C:
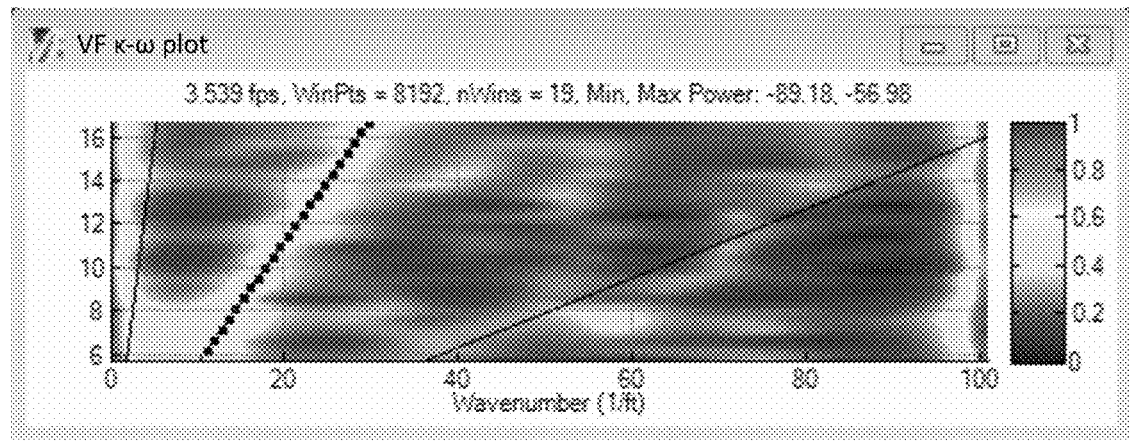
FIG. 6C is a k–ω plot showing temporal versus spatial frequency domain representation of the sensor signal data.
Figure 6D:
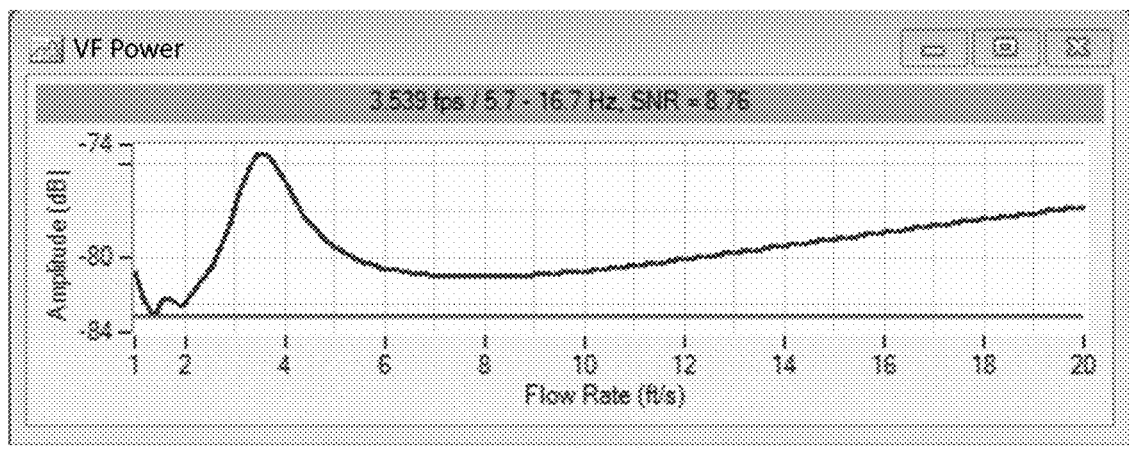
FIG. 6D is a graph of amplitude versus flow rate, showing the algorithmic interpretation of the k–ω plot data.
Figure 7A:
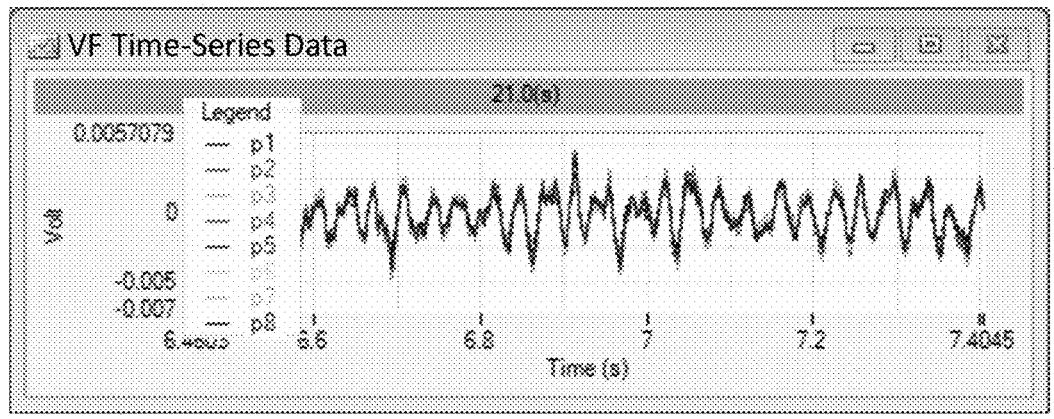
FIG. 7A is a graph of sensor signal magnitude versus time for an array of sensors sensing single phase water with a Coriolis unit not operating.
Figure 7B:
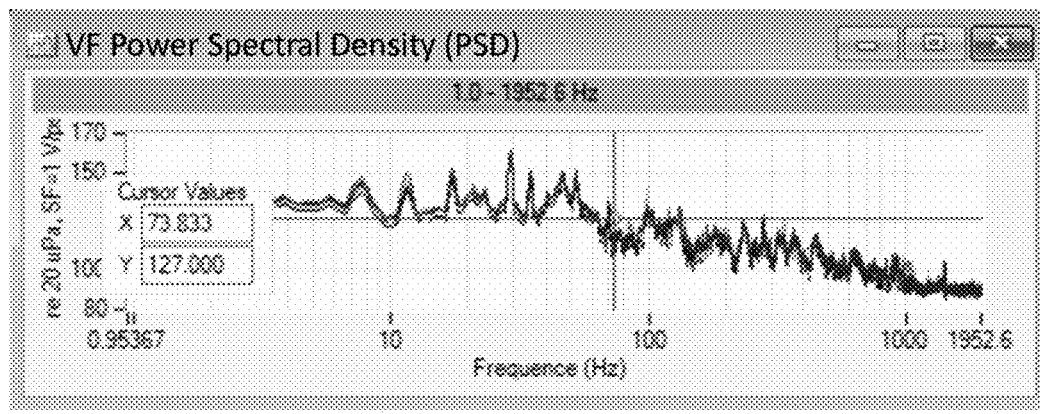
FIG. 7B is a graph of power spectral density of the sensor signals.
Figure 7C:
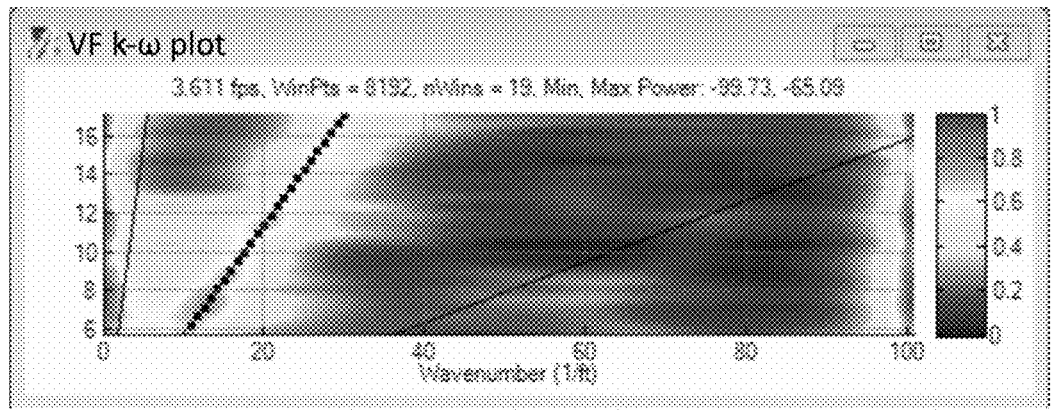
FIG. 7C is a k–ω plot showing temporal versus spatial frequency domain representation of the sensor signal data.
Figure 7D:
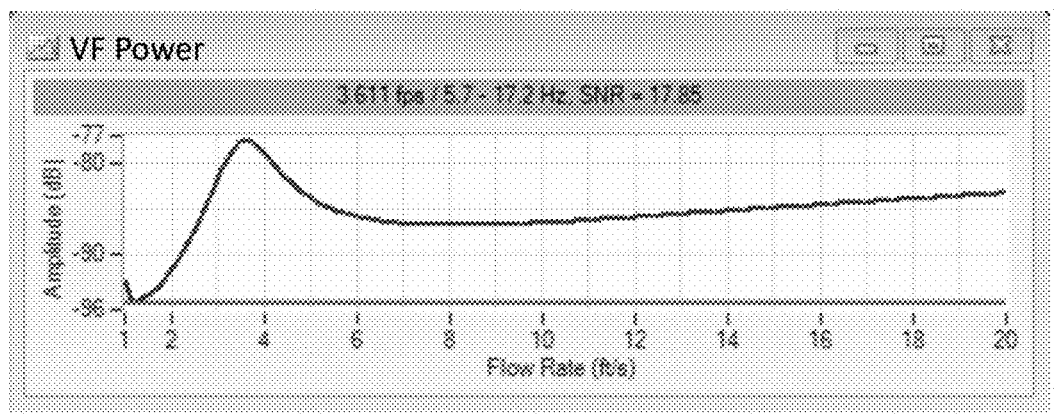
FIG. 7D is a graph of amplitude versus flow rate, showing the algorithmic interpretation of the k–ω plot data.

FIGS. 6A-6D show diagnostic data from a convective velocity augmented Coriolis meter 21 operation on single phase water with a measured convective velocity of ~3.5 ft/sec. FIG. 6A shows the amplified signals from each of eight (8) array sensors 24, spaced 0.75 inches apart on a 1.8 inches diameter flow tube 28. FIG. 6B shows the power spectral density (PSD) of the eight signals. FIG. 6C shows the temporal vs spatial frequency domain representation of the data (in the form of a "k–ω" plot). FIG. 6D shows the output of the algorithm that interprets the k–ω plot used to determine the convective velocity. The k–ω plot shows the "convective ridge", the slope of which, in the temporal versus spatial frequency domain, determines the convective velocity. As shown, the k–ω plot is plotted from 6 to 16 Hz. The power spectral densities of the individual sensors show a prominent peak in each of the sensors at the driven Coriolis frequency of ~74 Hz with the largest peak at an amplitude of 215 dB in relative units. The time domain data shows that the signals are dominated by a tone at the driven Coriolis frequency. The amplitude of the drive tone on each array sensor varies, in part due to the position of the respective sensor with respect to the vibrational mode shape. The largest signal amplitude is ~0.7 volts.

Although the strain-based sensors 24 are driven at ~74 Hz, the algorithm relies on the information at much lower frequencies to determine the convective velocity. For the example shown in FIGS. 6A-6D, the processing is able to identify a convective ridge and determine a convective velocity despite the dominance of the drive frequency tone.

FIGS. 7A-7D show similar diagnostic data as is shown in FIGS. 6A-6D with the Coriolis meter 21 turned off. As shown, the peak associated with the drive frequency of ~74 Hz is significantly reduced, from amplitude of 215 dB to 127 dB, which is a reduction of approximately 90 dB. The time domain signals from the sensor array 22 are all well-matched from the data without the Coriolis meter excitation, with a peak amplitude of ~0.005 volts. The power spectral density (PSD) shows that the information from 6 to 16 Hz constitutes a signal portion of the power in the measured signals. The k–ω plot has a more evident convective ridge. The example shown in FIGS. 6A-6D has a quantitative measurement of the quality of signal ("Q"; between 0 and 1) value of 0.805 for the measurement of the convective ridge with the Coriolis meter 21 in operation. In the example shown in FIGS. 7A-7D, the Q value is 0.972 when the Coriolis meter 21 is not operating.

For the conditions shown in FIGS. 6A-6D and 7A-7D, the convective velocity augmented Coriolis meter 21 was able to make an acceptable measurement of the convective velocity independent of whether the Coriolis meter 21 was driving the tubes. However, the quality of the measurement is significantly improved for the case with the Coriolis meter 21 not driving the tubes; e.g., as shown in FIGS. 7A-7D. This difference in quality ("Q") becomes more important for lower convective velocities and for multiphase conditions, indicating that a convective velocity augmented Coriolis meter 21 operating with reduced tube excitation will likely provide improved convective velocity measurement. Under normal operation, the flow tubes 28 are typically undergoing a highly resonant, nearly sinusoidal oscillation, approaching a time-stationary condition. Under operating conditions, there are many standard techniques that can be used to isolate the large strain signals picked up by the strain-based sensors 24 associated with the intentional Coriolis flow tube vibration from the smaller, broad band strain associated with the convection of coherent structures convecting within the flow tube 28. Examples include the Fourier analysis to transform the problem into the frequency domain used in FIGS. 6A-6D and 7A-7D. The ability to remove the effects of vibration from the lower frequency signals associated with coherent convective structures improves as the Coriolis flow tube excitation becomes more time stationary.

However, under multiphase conditions, the tubes 28 are typically not undergoing a highly resonant, nearly time stationary oscillation vibration. The flow tubes 28 are often stalled, and the Coriolis control algorithm is attempting to "unstall" the tubes, often forcing the tubes 28 with highly transient, non-time stationary excitation. This highly transient, non-stationary excitation typically contains frequency content that extends to frequencies that interfere with measurement of the convective velocity measurement. For example, impulse functions such as a dirac delta function are known to contain all frequencies.

The present disclosure teaches the practice of reducing the amplitude drive tube excitation that can impair convective velocity measurements from the sensor array 22 mounted on the flow tubes 28. For example, reducing the drive gain excitation to a minimum required to maintain a density measurement, for periods for which the mass flow measurement from a measured phase difference is deemed unreliable, can improve the performance of a convective velocity augmented Coriolis meter 21.

Figure 8:
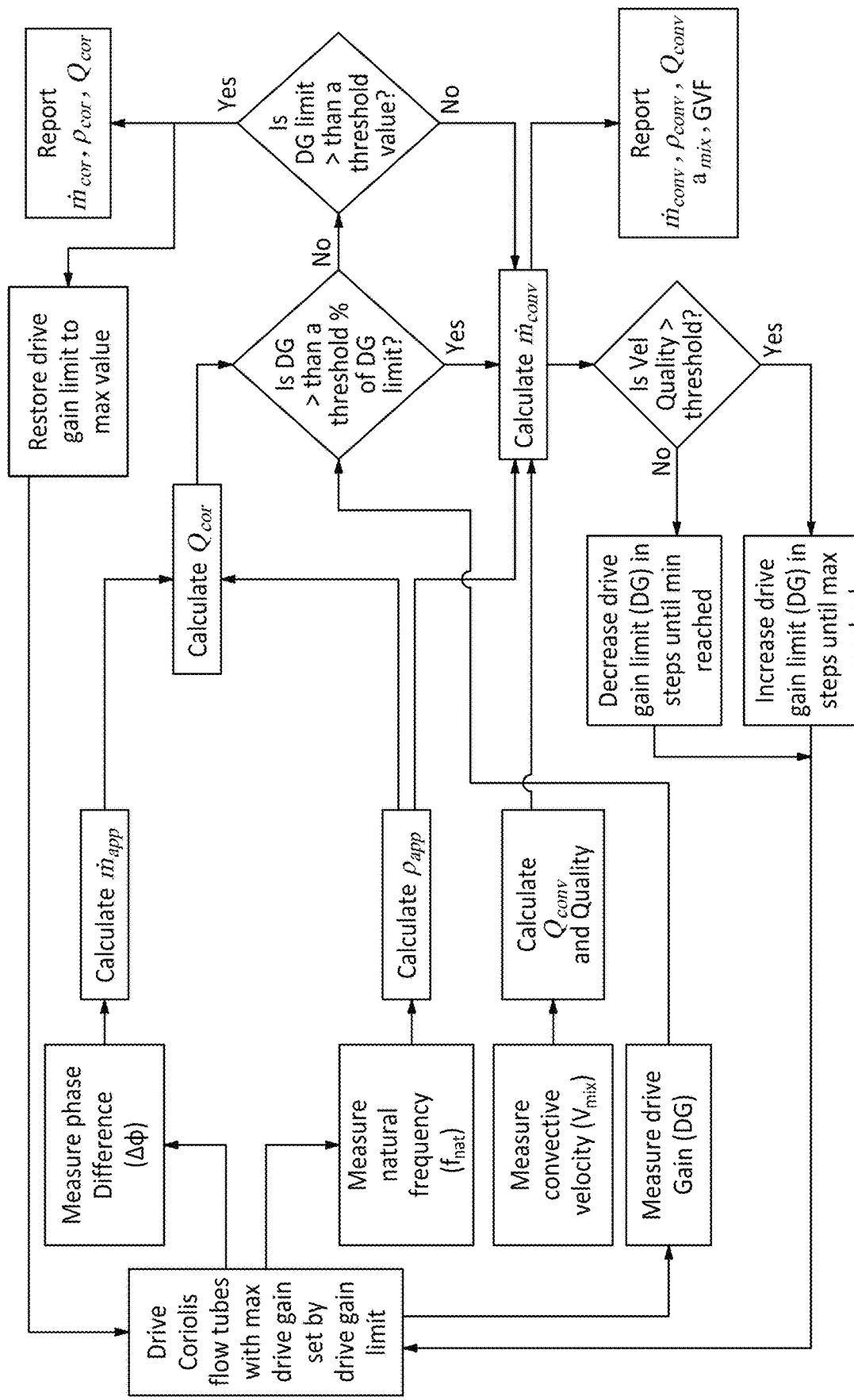
FIG. 8 is a schematic representation of a present disclosure system.

FIG. 8 shows a schematic for a convective velocity augmented Coriolis meter system 20 embodiment of the present disclosure with drive-gain limit logic. The drive gain for conventional Coriolis meters is typically limited to a maximum level typically set by hazardous area safety limitations. In this embodiment of the present disclosure, the drive gain limit becomes a parameter in the control logic of the Coriolis meter 21. The maximum level of drive gain is set based on the constraints that sets the maximum drive gain of conventional Coriolis meters. However, the drive gain limit in this embodiment is set by the logic schematically shown in FIG. 8. As shown, the present disclosure method embodiment determines a phase difference, a tube natural frequency, a convective velocity, and a convective velocity quality metric. The convective velocity quality metric is a measure of the quality of the convective ridge, one form of which is a standard output from a SONAR-based flow meter. The Coriolis meter 21, as with conventional Coriolis meters, also monitors the drive gain required to maintain a given tube vibration amplitude.

As indicated, in this embodiment the Coriolis meter 21 monitors the drive gain with respect to a drive gain limit. Initially, the drive gain limit is set to the maximum allowable. If the drive gain is below a threshold percentage of the drive gain limit, the Coriolis meter 21 reports the mass flow and density as measured from the phase difference and the natural frequency of the tube 28. However, if the drive gain exceeds the threshold percentage of the drive gain limit, the Coriolis meter 21 utilizes a convective velocity measurement ($V_{mix}$—from the sensor array 22) along with the density measurement ($\rho_{app}/\rho_{cor}$) to determine and report a volumetric flow ($Q_{conv}$), density ($\rho_{conv}$), and mass flow ($\dot{m}_{conv}$).

The control logic also then compares the quality of the convective velocity measurement. If the quality is below a threshold value, the control logic reduces the drive gain limit to progressively approach a lower limit set by the respective processing unit. If the quality is above a threshold limit, the control logic increases the drive gain limit to progressively approach an upper limit of the control logic.

Under sufficiently homogeneous flow conditions, the convective velocity augmented Coriolis meter system 20 with drive gain limit logic embodiment schematically shown in FIG. 8 operates similar to a conventional Coriolis meter. However, during multiphase flow conditions that occur as indicated by the drive gain, the system 20 utilizes the convective velocity ($V_{mix}$) measurement and when needed, reduces the drive gain of the Coriolis meter 21 to enable improved convective velocity measurement in multiphase conditions. The logic also enables the Coriolis meter 21 to return to more standard operation in the absence of multiphase flow conditions. In this embodiment, the algorithm embodiment schematically shown may be executed at the update rate of the Coriolis meter, typically multiple times a second. Changes to control parameters such as drive gain limit would be implemented over several time steps with sufficient damping in the control logic to ensure stability.

Figure 9:
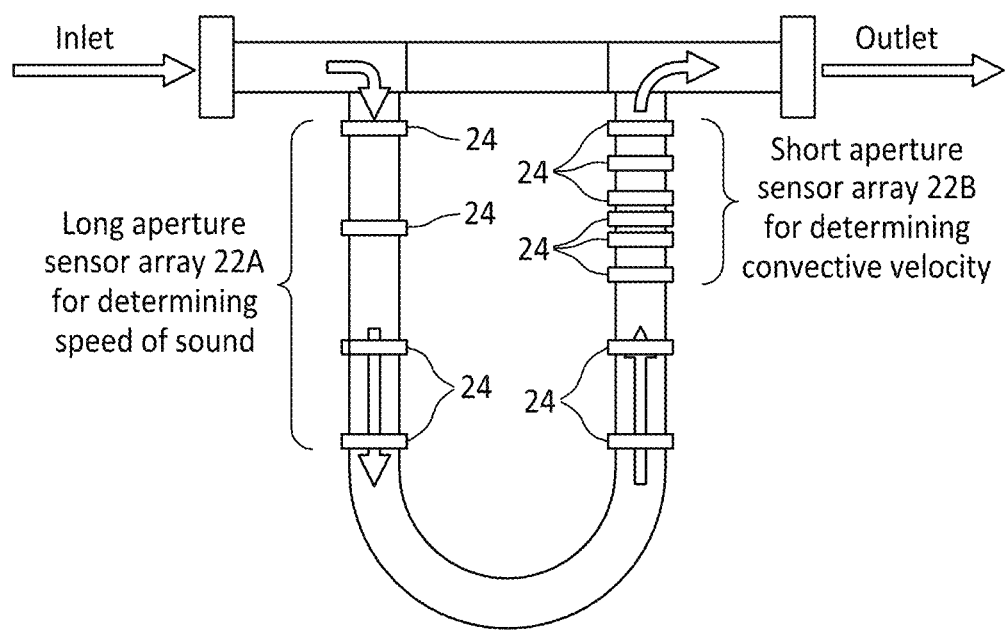
FIG. 9 is diagrammatic view of a sensor array embodiment mounted on a flow tube of a Coriolis meter.

Another embodiment of the present disclosure utilizes measurement of both process fluid sound speed and the convective velocity of the process fluid. FIG. 9 illustrates an example of a sensor array 22 (22A, 22B) that may be used to determine the aforesaid SOS and convective velocity. This system 20 embodiment is particularly useful for applications in which effects of inhomogeneity and/or compressibility on the density measurement provided by a Coriolis meter 21 are well-mitigated utilizing the measured speed of sound of the process fluid, but the effects of inhomogeneities and/or compressibility on the mass flow measurement provided by the Coriolis meter 21 may or may not be effectively mitigated utilizing a process fluid speed of sound measurement.

The schematic embodiment of FIG. 9 shows a long aperture sensor array 22A to measure the speed of sound of the process fluid and shorter aperture array 22B to measure the convective velocity of the process fluid. Note that the sensors 24 could be part of a single sensor array containing all of the sensors 24, or the speed of sound and convective velocity measurement could be implemented via separate sensor arrays. Also, in this embodiment, any sensor 24 could be used within one or both of the sensor arrays. The primary objective of the strain based sensors 24 is to provide one or more sensor arrays of pressure based strain sensors that provide sufficient aperture and resolution to measure both process fluid speed of sound and convective velocity. The specific requirements of number of sensors 24 and spacing to perform this functionality optimally may vary depending on the application.

Figure 10:
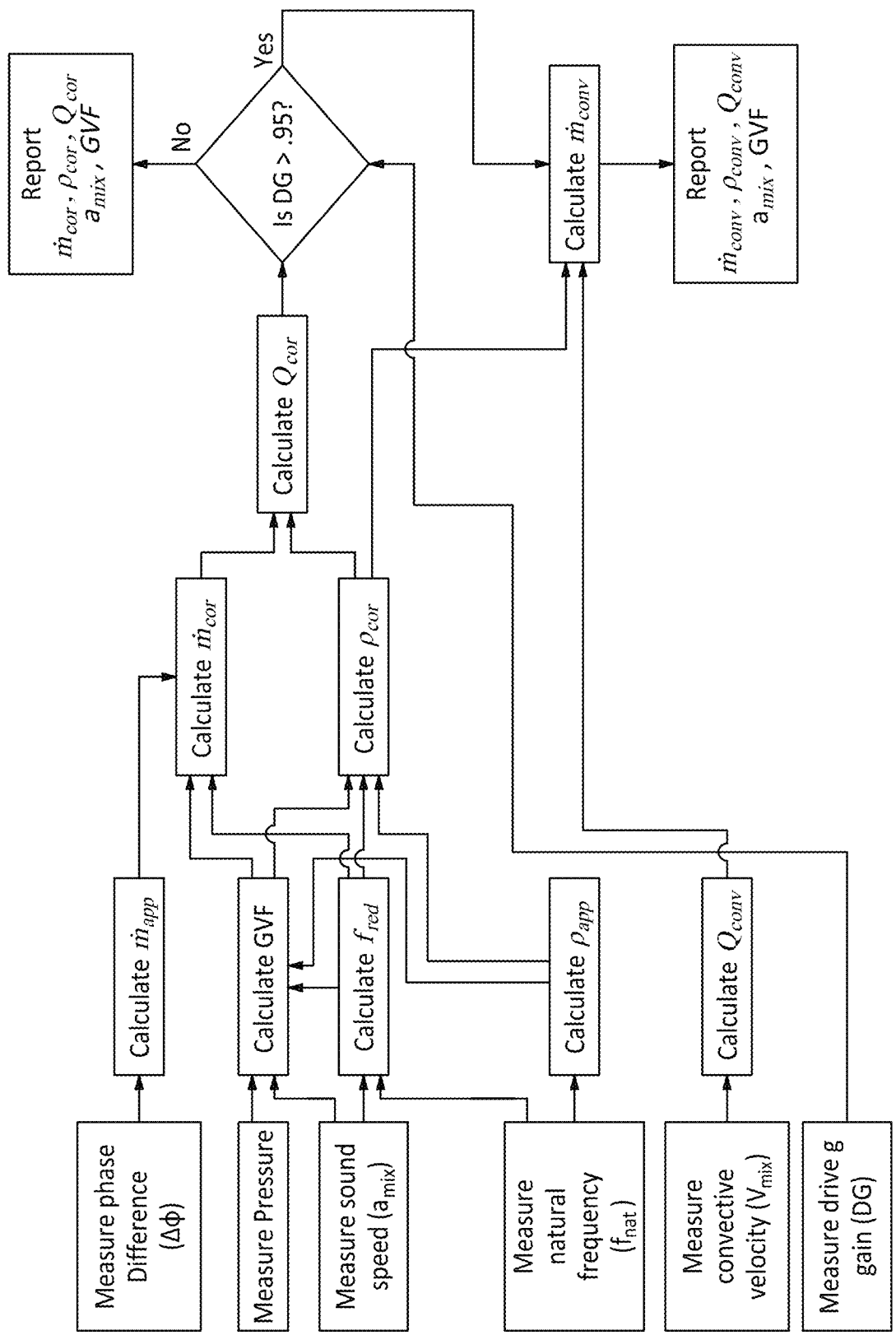
FIG. 10 is a schematic representation of a present disclosure system.

FIG. 10 shows a schematic embodiment of a speed of sound and convective velocity augmented Coriolis meter system 20. This embodiment of the present disclosure teaches a method which utilizes process fluid sound speed (SOS) in conjunction with the apparent fluid density ($\rho_{app}$) reported by a Coriolis meter 21 operating at an assumed, typically low, reduced frequency on a homogeneous fluid to determine gas void fraction (GVF), and a liquid phase density ($\rho_{cor}$) for the process fluid using the apparent fluid density ($\rho_{app}$) and a fluid by utilizing empirical models to account for the effects of fluid decoupling and fluid compressibility. Additionally, the process fluid GVF and reduced frequency are used to correct the apparent mass flow to determine a corrected Coriolis-based mass flow ($\dot{m}_{cor}$).

In addition to correcting the mass flow rate and the density measurements reported by the Coriolis meter 21, the algorithm also measures a convective flow velocity ($V_{mix}$) and interprets this in terms of volumetric flow rate ($Q_{conv}$) of the process fluid, using calibration techniques known in the art. The volumetric flow of the liquid phase is determined utilizing the GVF of the volumetric flow of the process fluid. The volumetric flow of the liquid phase is multiplied by the density of the liquid phase, determined from a Coriolis-based density measurement ($\rho_{cor}$) utilizing the measured GVF and reduced frequency and models to correct for decoupling and compressibility effects, to determine a mass flow measurement ($\dot{m}_{conv}$). This mass flow measurement is independent of the mass flow measurement ($\dot{m}_{cor}$) based on the measured phase difference in the vibrating flow tubes 28.

The algorithm then determines which mass flow ($\dot{m}_{conv}$ or $\dot{m}_{cor}$) to use based on quality metrics. In general, for sufficiently homogeneous flows at sufficiently low reduced frequencies, it is likely that the mass flow ($\dot{m}_{cor}$) based on a speed of sound augmented Coriolis measurement would be the preferred method to determine the process fluid mass flow. However, as inhomogeneity and/or compressibility increases, it is likely that a mass flow ($\dot{m}_{conv}$) determined based on a convective velocity and speed of sound augmented Coriolis density measurement would be preferred. In this embodiment, the algorithm utilizes a threshold value of the drive gain to make that determination. If the drive gain is below a threshold value, the algorithm reports the mass flow ($\dot{m}_{cor}$) derived from the Coriolis meter 21, above the threshold value, the algorithm reports the mass flow ($\dot{m}_{conv}$) derived from the convective flow velocity. Other quality metrics that provide an indication of the homogeneity and/or the compressibility of the process flow could be used, including speed of sound of the process fluid, GVF, reduced frequency, and the like to determine an optimized mass flow measurement based on some combination of one or both of the two independently determined mass flow measurements.

Figure 11:
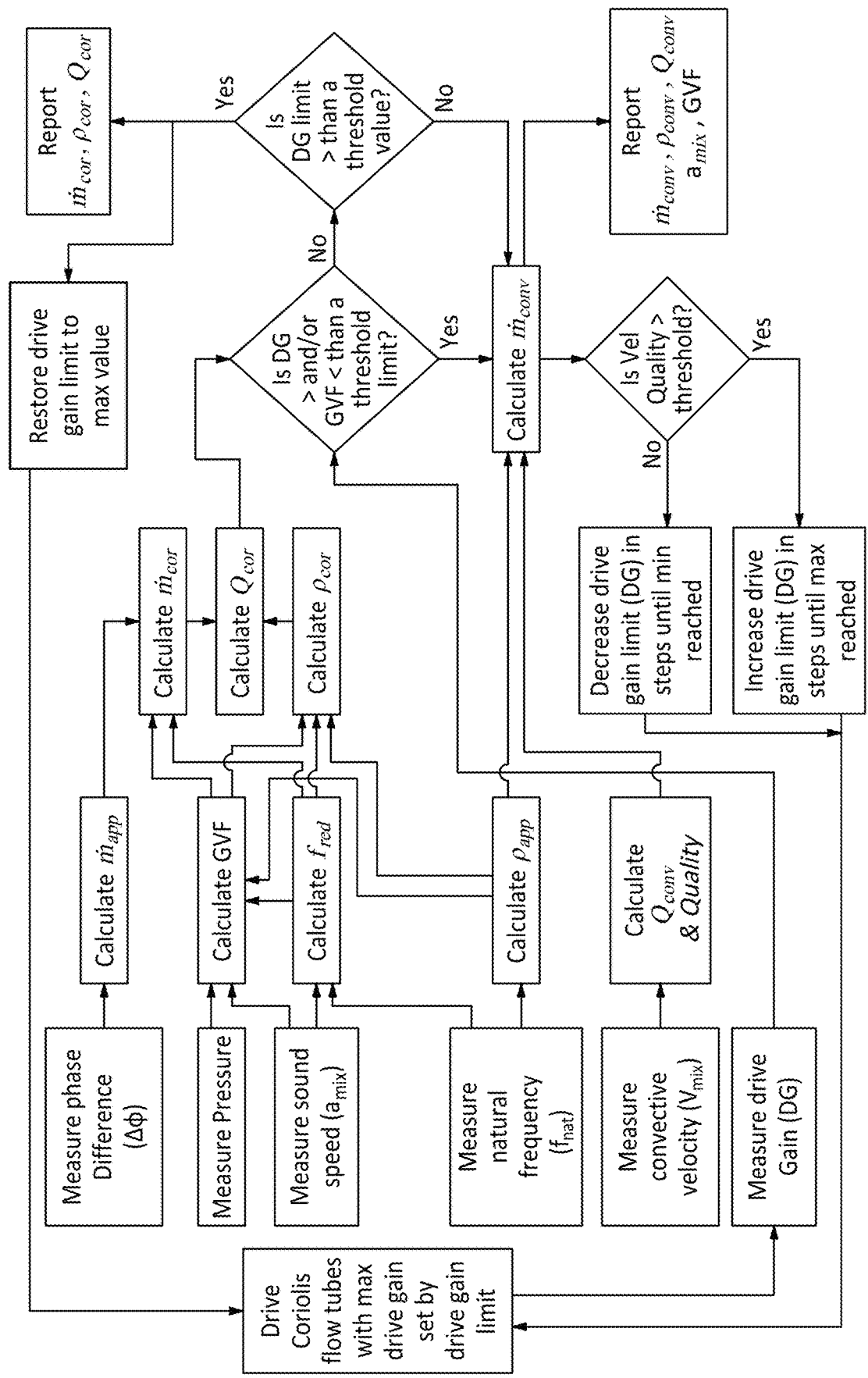
FIG. 11 is a schematic representation of a present disclosure system.

FIG. 11 shows flow chart for a convective velocity augmented Coriolis meter system 20 embodiment with drive gain limit logic. As shown, the Coriolis meter 21 utilizes measured process fluid sound speed to enhance the interpretation of process fluid mass flow and density and to determine a GVF of the process fluid. The methodology utilizes drive gain and/or GVF and/or process fluid speed of sound or a combination thereof, to determine whether to utilize the Coriolis-based mass flow measurement ($\dot{m}_{cor}$), or whether to utilize a convective velocity based volumetric flow measurement to report process fluid mass flow ($\dot{m}_{conv}$), density ($\rho_{conv}$), and volumetric flow rate ($Q_{conv}$). Additionally, the methodology has logic to reduce the drive gain limit if the convective velocity quality is low, and logic to restore drive gain and revert to a Coriolis-based mass flow measurement under sufficiently homogenous flow conditions.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

Additionally, even though some features, concepts, or aspects of the disclosures may be described herein as being a preferred arrangement or method, such description is not intended to suggest that such feature is required or necessary unless expressly so stated. Still further, exemplary, or representative values and ranges may be included to assist in understanding the present application, however, such values and ranges are not to be construed in a limiting sense and are intended to be critical values or ranges only if so expressly stated.

The invention claimed is:

1. A system for sensing a process fluid, comprising:
    a vibrating tube flow meter having at least one flow tube, the meter configured to selectively provide a measurement of a mass flow of the process fluid, a measurement of the density of the process fluid, and a drive gain signal, the process fluid passing through the at least one flow tube;
    a sensor array having a plurality of sensors configured to sense a characteristic of the process fluid that convects with the process fluid through at least one flow tube, and produce sensor signals representative of the process fluid characteristic convecting with the process fluid;
    a sensor array processing unit (SAPU) in communication with the sensor array and a memory device storing executable SAPU instructions, wherein the SAPU instructions when executed cause the sensor array processing unit to process the sensor signals to determine a convective velocity of the process fluid; and
    a system processing unit (SPU) in communication with the vibrating tube flow meter, the SAPU, and a memory device storing executable SPU instructions, wherein the SPU instructions when executed cause the SPU to:
        control the vibrating tube flow meter to produce the drive gain signal; and
        report a mass flow rate of the process fluid, wherein the reported mass flow rate is measured by the vibrating tube flow meter when the drive gain signal is at or below a predetermined drive gain threshold, and the reported mass flow rate is determined using the convective velocity determined by the SAPU and a density of the process fluid as measured by the vibrating tube flow meter when the drive gain signal is above the predetermined drive gain threshold.

2. The system of claim 1, wherein the SAPU instructions when executed cause the SAPU to determine a quality metric; and
    the predetermined drive gain threshold is a function of the quality metric.

3. The system of claim 1, wherein the plurality of sensors in the sensor array are strain based sensors.

4. The system of claim 3, wherein the plurality of sensors are mounted on the at least one flow tube.

5. The system of claim 1, wherein the SAPU instructions when executed cause the SAPU to process the sensor signals to determine a convective quality value.

6. The system of claim 5, wherein the SPU instructions when executed cause the SPU to adjust a drive gain limit of the vibrating tube flow meter if the convective quality value is at or above a convective quality value threshold.

* * * * *